March 29, 1932.   A. PETERSON ET AL   1,851,773
SAW SET
Filed April 15, 1931
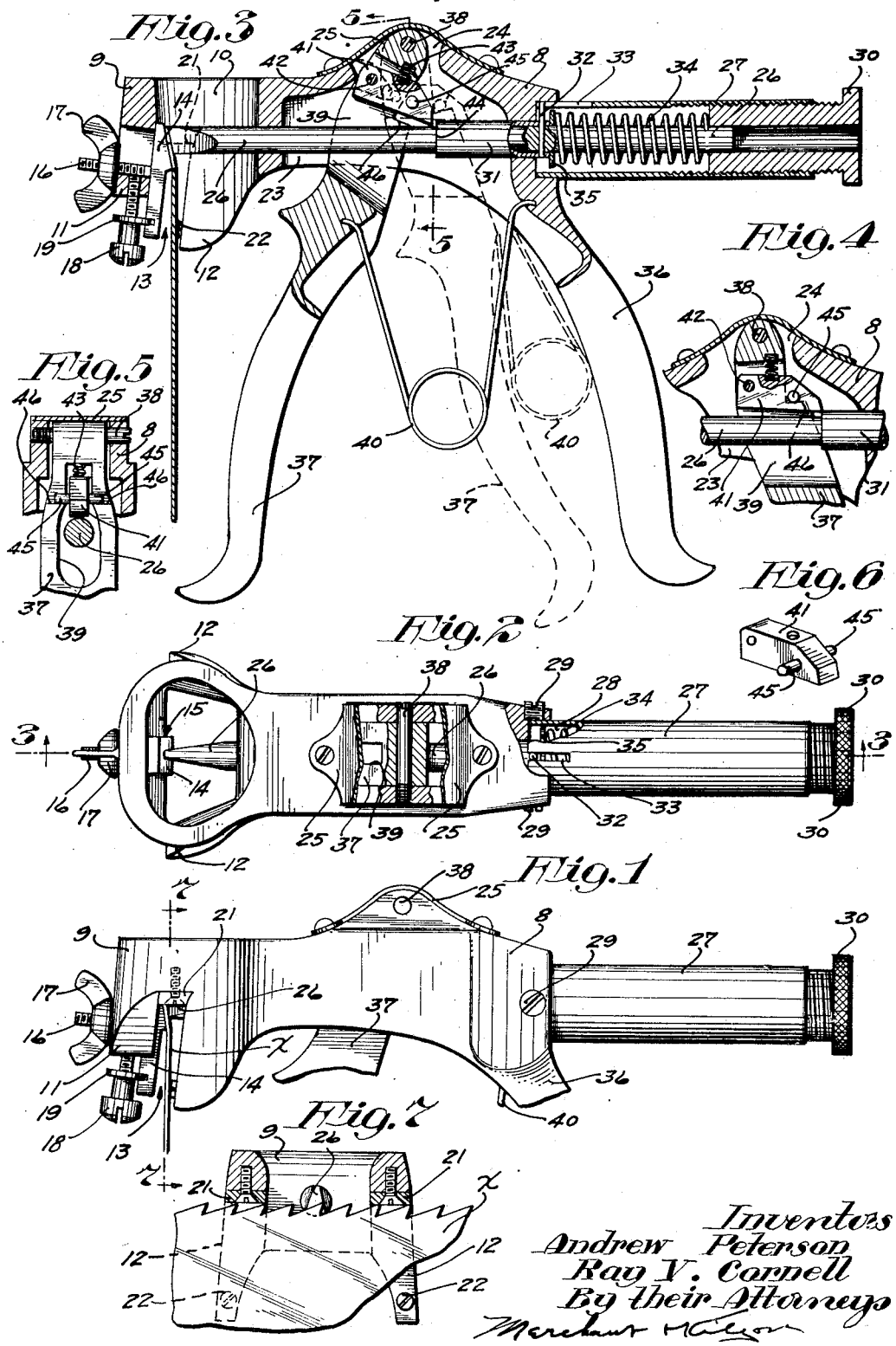
Inventors
Andrew Peterson
Ray V. Cornell
By their Attorneys Patented Mar. 29, 1932

1,851,773

UNITED STATES PATENT OFFICE

ANDREW PETERSON AND RAY V. CORNELL, OF MINNEAPOLIS, MINNESOTA, ASSIGNORS TO FOLEY MANUFACTURING COMPANY, OF MINNEAPOLIS, MINNESOTA, A CORPORATION OF MINNESOTA

SAW SET

Application filed April 15, 1931. Serial No. 530,200.

Our invention relates to saw sets of the type commercially known as the pistol grip saw set and has for its object the provision of such a tool that is simple in construction, easy to operate, and that embodies an anvil and a co-operating plunger-like hammer that is actuated by a variably tensioned propelling spring to deliver a blow of uniform force on the teeth of a saw on the anvil, and set the teeth at the same and correct angle.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a side elevation of the saw set, some parts being broken away;

Fig. 2 is a view principally in plan with some parts broken away and sectioned;

Fig. 3 is a view principally in longitudinal central section taken on the line 3—3 of Fig. 2, with some parts shown in different positions by means of broken lines;

Fig. 4 is a fragmentary detail view showing the operating lever, hammer and dog as positioned by broken lines in Fig. 3;

Fig. 5 is a fragmentary detail view principally in transverse section taken on the line 5—5 of Fig. 3;

Fig. 6 is a perspective view of the dog removed from the saw set; and

Fig. 7 is a fragmentary detail view with some parts sectioned on the line 7—7 of Fig. 1, on an enlarged scale.

The numeral 8 indicates a cast metal stock having at one end a transversely expanded head 9, provided with a vertical passage 10. Formed with the head 9 is a depending front jaw 11 and a depending rear jaw 12, said jaws being spaced to leave a transverse saw passage 13 therebetween. An anvil 14 is mounted in a vertical way 15 in the inner face of the jaw 11 for vertical sliding movement. This anvil 14 is rigidly secured to the front jaw 11 in different vertical adjustments by a screw stud 16 having a thumb nut 17. Said stud 16 is rigidly secured to the anvil 14 and extends through a vertical slot in the jaw 11 which permits the required vertical adjustment of said anvil. The nut 17 impinges against the outer face of the jaw 11 and frictionally holds the anvil 14 on the opposite side of said jaw. To raise or lower the anvil 14 in its way 15, there is provided a thumb screw 18 that has screw-threaded engagement with the jaw 11 and is connected to said anvil with freedom to turn in respect thereto by a collar 19, which works in a transverse notch in the anvil 14.

Co-operating with the anvil 14 to determine the depth at which the teeth of a saw $x$ are to be set, is a depth gauge 21 in the form of a pair of blocks in the saw passage 13 detachably secured by screws to the head 9, see Fig. 7. The jaw 12 is bifurcated and the prongs thereof extend materially below the jaw 11 and have on the inner faces of the lower end portions of their prongs, contact points 22, which as shown, are screws. In the under side of the stock 8 is a large recess 23 and in the top of said stock above the recess 23 is a passage 24 normally closed by a detachable cover plate 25 held in place by screws.

Co-operating with the anvil 14 is a plunger-like hammer 26 in the form of a horizontal rod mounted, for endwise reciprocatory movement in respect to the anvil 14, in a pair of bore-like seats formed in the stock 8, one on each side of the recess 23. A tubular shell 27 affording a spring chamber 28 is detachably secured to the opposite end of the stock 8 from its head 9 by telescoping the same into a bore in said stock and rigidly securing the same thereto by a pair of diametrically opposite screws 29. This shell 27 is in axial alignment with the hammer 26 and its rear end is closed by a long screw plug 30.

Telescoped onto the hammer 26 is a sleeve 31, which has a pressed fit therewith and is rigidly secured thereto by a radial pin 32, one end of which extends into a longitudinal notch 33 in the inner end of the shell 27. This pin 32 in addition to holding the sleeve 21 against axial movement on the hammer 26 also holds the hammer from turning about its longitudinal axis and thereby keeps the head of the hammer 26 in a definite and predetermined relation to the anvil 14 and at the same time permits the required reciprocatory movement of said hammer.

The hammer 26 is actuated to deliver a blow onto the anvil 14 by a propelling coiled spring 34 which encircles said hammer within the spring chamber 28 and is compressed between a washer 35 on the hammer 26 and the screw plug 30. Said washer 35 engages the rear end of the sleeve 31 as a base of resistance and the screw plug 30 affords an abutment or fixed base of resistance for the propelling spring 34, and which abutment is adjustable to vary the tension of the spring 34 and hence the force of the blow delivered by the hammer 26.

Formed as a part of the stock 8 at the rear end thereof is a depending handle 36. A depending operating lever 37 is provided for retracting the hammer 26 and which lever is forward of the handle 36 and of substantially the same shape except that its position is reversed. The upper end portion of the lever 37 extends through the recess 23 and into the passage 24 where the same is fulcrumed to the stock 8 by a horizontal pivot 38 in the form of a screw for swinging movement toward and from the handle 36. Formed in the lever 37 is a large passage 39 through which the hammer 26 extends with freedom for its necessary reciprocatory movement. A sear spring 40 between the handle 36 and lever 37 has its arms attached to said handle and lever and normally and yieldingly holds the lever 37 pressed forward, or in other words, away from the handle 36.

A dog 41 carried by the lever 37 for cooperation with the sleeve 31 is provided to connect said lever to the hammer 26 and retract the same by a movement of the lever 37 toward the handle 36. This dog 41 is mounted in the passage 39 above the hammer 26, is attached to the lever 37 by a horizontal pivot 42, for raising and lowering movements in a plane that radiates from the longitudinal axis of the hammer 26.

A normally compressed coil spring 43 mounted in opposing seats in the lever 37 and dog 41, yieldingly holds said dog pressed onto either the hammer 26 or sleeve 31, depending on the position of said hammer. When the hammer 26 is projected, the dog 41 is forward of the sleeve 31 and during the initial movement of the lever 37 toward the handle 36, the dog 41 engages the forward end of the sleeve 31 as a shoulder 44 and retracts the hammer 26. The retracting movement of the hammer 26 compresses the spring 34.

To trip the dog 41 out of engagement with the shoulder 44 said dog is provided with a transverse pin 45 and the lever 37 is provided with a pair of shoulders 46, one on each side of the passage 39. These shoulders 46 are arranged to engage the end portions of the pin 45 during the final retracting movement of the hammer 26, lift the dog 41 out of engagement with the shoulders 44 and release the hammer 26. The released hammer 26 is driven forward by the compressed propelling spring 34 and bends the teeth of the saw positioned between the anvil 14 and hammer 26 onto said anvil, which gives the tooth the proper set. The propelling spring 34 always operates the hammer 26 so that it delivers blows on the anvil 14 with uniform force, thus giving all of the teeth of the saw the same set.

The saw set is held in one hand by means of its handle 36 and lever 37 and each time said lever is drawn toward the handle 36, as shown by broken lines in Fig. 3, the dog 41 engages the shoulder 44, retracts the hammer 26 and during the final movement of the lever 37 toward the handle 36, its shoulders 46 engage the pin 45 and lift the dog 41 out of engagement with the shoulder 44 and release the hammer 26 to the compressed propelling spring 44.

When the saw set is in operation, its depth gauge 21 rests on the points of the teeth of the saw, which is held in an inverted position in a vise, (not shown), and supports the saw set therefrom. The weight of the saw set when supported, as shown in Fig. 3, and the natural pressure on the handle 36 toward the saw $x$ will hold the contact points 22 in engagement with the saw $x$ and the anvil 14 against the opposite side of the saw.

Obviously, the anvil 14 and contacts 22 afford a three-point contact between the saw set and saw which automatically and correctly positions the saw set in respect to the saw, so that the operative face of the anvil 14 is parallel to the teeth of the saw. The depth gauge 21 at the same time automatically positions the teeth on the anvil 14 as to the depth of the set.

The above described saw set, while extremely simple, particularly as to its method of actuating the hammer 26, is positive and uniform in its action.

What we claim is:

1. A device of the class described comprising a stock having a head provided with a saw guide and an anvil, a handle on the stock, a spring-propelled plunger-like hammer mounted in the stock for co-operation with the anvil, an operating lever fulcrumed on the stock, and a trip connection actuated by the lever for retracting the hammer, said lever having a part arranged to trip the connection out of action during the retracting movement of the hammer to release the same.

2. A device of the class described comprising a stock having a head provided with a saw guide and an anvil, a spring-propelled plunger-like hammer mounted in the stock for co-operation with the anvil and having a lock shoulder, an operating lever fulcrumed on the stock, a dog pivoted to the lever and arranged to engage said shoulder during the initial movement of the lever to retract the hammer, said lever having a part arranged to trip the dog out of engagement with the shoulder during the retracting movement of the hammer to release the same.

3. The structure defined in claim 2 in which the dog is normally spring-held in contact with the hammer.

4. A device of the class described comprising a stock having a head provided with a transverse saw guide and an anvil, a spring-propelled plunger-like hammer mounted in the stock for co-operation with the anvil, a depending handle on the stock, a recess in the under side of the stock between the head and handle, a depending operating lever the upper end of which is in the recess and fulcrumed to the stock, and trip connection actuated by the lever for retracting the hammer, said lever having a part arranged to trip the connection out of action during the retracting movement of the hammer to release the same.

5. A device of the class described comprising a stock having a head provided with a saw guide and an anvil, a spring-propelled plunger-like hammer mounted in the stock for co-operation with the anvil and having a lock shoulder, a lever fulcrumed on the stock, a dog pivoted to the lever eccentric to its fulcrum and normally spring-held in engagement with the hammer, said dog being arranged to engage the lock shoulder during the initial movement of the lever to retract the hammer, said lever having a shoulder arranged to lift the dog out of engagement with the lock shoulder during the retracting movement of the hammer to release the same.

6. A device of the class described comprising a stock having a head provided with a saw guide and an anvil, a depending handle on the stock, said stock having a recess in its under side between the head and handle, a spring-propelled plunger-like hammer, mounted in a pair of seats, one on each side of said recess, for co-operation with the anvil, said hammer having a lock shoulder, a depending operating lever, the upper end of which extends into the recess and is fulcrumed to the stock above the hammer, a dog pivoted to the lever above the hammer and eccentric to the fulcrum of said lever, said dog being arranged to engage the lock shoulder during the initial movement of the lever to retract the hammer, said lever having a part arranged to lift the dog out of engagement with the lock shoulder during the retracting movement of the hammer to release the same.

7. The structure defined in claim 6 in which the lever is provided with a passage through which the hammer works.

8. A device of the class described comprising a stock having a head provided with a saw guide and an anvil, a depending handle on the stock, said stock having a recess in its under side between the head and handle, a spring-propelled plunger-like hammer mounted in a pair of seats, one on each side of said recess for co-operation with the anvil, said hammer having a lock shoulder, a depending operating lever, the upper end of which extends into the recess and is fulcrumed to the stock above the hammer, a dog mounted in a passage in the lever through which the hammer extends and pivoted to the lever eccentric to its fulcrum and above the hammer, said dog being normally spring-pressed in engagement with the hammer and arranged to engage its lock shoulder during the initial movement of the lever to retract the hammer, said dog having on its sides a pair of studs, said lever having a pair of shoulders one on each side of its passage arranged to engage the studs on the dog and lift said dog out of engagement with the lock shoulder during the retracting movement of the hammer to release the same.

9. The structure defined in claim 4 in which the screw plug has a seat in which the rear end portion of the hammer is guided.

10. A device of the class described comprising a stock having a head provided with a saw guide and an anvil, a spring-propelled plunger-like hammer mounted in the stock for co-operation with the anvil, a sleeve telescoped onto the hammer and rigidly secured thereto, an operating lever fulcrumed on the stock, and a dog pivoted to the lever and arranged to engage one end of the sleeve during the initial movement of the lever and retract the hammer, said lever having a part arranged to trip the dog out of engagement with the sleeve during the retracting movement of the hammer to release the same.

11. A device of the class described comprising a stock having a head provided with a saw guide and an anvil, a spring-propelled plunger-like hammer mounted in the stock for co-operation with the anvil, a sleeve telescoped onto the hammer, a pin securing the sleeve to the hammer and working in a longitudinal notch in the inner end of the chamber and holding the hammer from turning about its longitudinal axis, an operating lever fulcrumed on the stock, and a dog pivoted to the lever and arranged to engage one end of the sleeve during the initial movement of the lever to retract the hammer, said lever having a part arranged to trip the dog out of engagement with the sleeve during the retracting movement of the hammer to release the same.

In testimony whereof we affix our signatures.

ANDREW PETERSON.
RAY V. CORNELL.